(12) United States Patent
Kratzsch et al.

(10) Patent No.: US 12,025,174 B2
(45) Date of Patent: Jul. 2, 2024

(54) TOLERANCE COMPENSATION ELEMENT, COMPONENT WITH THE TOLERANCE COMPENSATION ELEMENT AS WELL AS ASSOCIATED CONNECTION BETWEEN A FIRST AND A SECOND COMPONENT, PRODUCTION METHOD AND CONNECTING METHOD

(71) Applicant: Böllhoff Verbindungstechnik GmbH, Bielefeld (DE)

(72) Inventors: Jan Norman Kratzsch, Halle (DE); Peter Meilwes, Altenbeken (DE); Michaela Mücke, Detmold (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 239 days.

(21) Appl. No.: 17/840,973

(22) Filed: Jun. 15, 2022

(65) Prior Publication Data
US 2022/0412384 A1   Dec. 29, 2022

(30) Foreign Application Priority Data
Jun. 23, 2021  (DE) .......................... 102021116282.3

(51) Int. Cl.
*F16B 5/02*   (2006.01)
(52) U.S. Cl.
CPC ............ *F16B 5/025* (2013.01); *F16B 5/0233* (2013.01); *F16B 5/02* (2013.01)

(58) Field of Classification Search
CPC .......... F16B 5/02; F16B 5/0233; F16B 5/025; F16B 5/0275; F16B 5/0283; F16B 23/00;
(Continued)

(56) References Cited

U.S. PATENT DOCUMENTS 4,157,674 A * 6/1979 Carlson ............... F16B 25/0057
411/389
4,334,815 A * 6/1982 Knohl ................... F16B 35/007
411/389
(Continued)

FOREIGN PATENT DOCUMENTS

DE 3304569 C1 7/1984
DE 102005029529 A1 1/2007
(Continued)

*Primary Examiner* — Roberta S Delisle
(74) *Attorney, Agent, or Firm* — Reising Ethington P.C.

(57) ABSTRACT

A tolerance compensation element that compensates for tolerances in the distance between first and second components, includes a thread bolt having a first drive feature, a first thread of a first thread direction and a second thread of a second thread direction. Between the first and the second thread, a protrusion extends from the thread bolt radially to the outside. The element includes a first plastic overmold in the portion of the first thread, which provides a fastening structure for the fastening to the first component, and a second plastic overmold around the protrusion which extends radially to the outside, to provide an abutment portion abutting the second component when in use. A distance of the second plastic overmold to the first plastic overmold is changeable after overcoming a start-up torque between the first plastic overmold and the first thread in longitudinal direction of the thread bolt.

20 Claims, 12 Drawing Sheets

(58) Field of Classification Search
CPC .. F16B 25/00; F16B 25/0057; F16B 25/0068;
F16B 33/00; F16B 33/002; F16B 33/004;
F16B 35/00; F16B 35/04; F16B 35/041;
F16B 35/06; F16B 35/065
USPC ..... 411/182, 366.1, 383, 388–389, 411–412, 411/424

See application file for complete search history.

(56) References Cited

U.S. PATENT DOCUMENTS

| | | | | |
|---|---|---|---|---|
| 6,357,953 | B1* | 3/2002 | Ballantyne | F16B 5/0233 403/372 |
| 8,864,432 | B2* | 10/2014 | Figge | F16B 5/025 411/383 |
| 9,133,870 | B2 | 9/2015 | Spolyar | |
| 9,726,206 | B2 | 8/2017 | Spolyar | |
| 2013/0170895 | A1* | 7/2013 | Tseng | F16B 35/06 403/270 |
| 2014/0169912 | A1* | 6/2014 | Sutterluetti | F16B 35/041 411/389 |
| 2017/0045066 | A1* | 2/2017 | Couto Maquieira | F16B 5/0216 |
| 2019/0024688 | A1* | 1/2019 | Friszell | F16B 21/088 |
| 2019/0107135 | A1* | 4/2019 | Criado del Pino | F16B 37/041 |
| 2019/0128311 | A1* | 5/2019 | Cheung | F16B 43/009 |
| 2019/0293100 | A1* | 9/2019 | Cipriano | F16B 25/106 |
| 2020/0248733 | A1 | 8/2020 | Figge et al. | |
| 2021/0018026 | A1 | 1/2021 | Purwin | |
| 2021/0396253 | A1 | 12/2021 | Heinrichs | |

FOREIGN PATENT DOCUMENTS

| | | |
|---|---|---|
| DE | 102010005309 A1 | 8/2010 |
| DE | 102012011750 A1 | 12/2013 |
| DE | 102012219577 A1 | 4/2014 |
| DE | 202014101383 U1 | 4/2014 |
| DE | 102014009257 A1 | 1/2016 |
| DE | 102017124809 A1 | 4/2019 |
| DE | 102017131235 A1 | 6/2019 |
| EP | 0612635 A1 | 8/1994 |
| EP | 3502490 A1 | 6/2019 |
| WO | WO2017205126 A1 | 11/2017 |
| WO | WO2020088878 A1 | 5/2020 |

* cited by examiner

TOLERANCE COMPENSATION ELEMENT, COMPONENT WITH THE TOLERANCE COMPENSATION ELEMENT AS WELL AS ASSOCIATED CONNECTION BETWEEN A FIRST AND A SECOND COMPONENT, PRODUCTION METHOD AND CONNECTING METHOD

CROSS REFERENCE TO RELATED APPLICATIONS

This application claims the priority of German patent application No. DE102021116282.3, filed on Jun. 23, 2021, and the content of this priority application is incorporated herein by reference in its entirety.

TECHNICAL FIELD

The present disclosure is related to a tolerance compensation element with which tolerances in the distance between a first and a second component are compensable, a first component with the tolerance compensation element, a connecting structure consisting of the first component and a second component, a production method of the tolerance compensation element as well as a connecting method of a first component with a second component by means of the tolerance compensation element.

BACKGROUND

Tolerance compensation elements are known in the state of the art in a large variety from fastening arrangements for the fastening of two components to one another with a distance in between, which may be in the sector of the automotive construction.

An example for an adjustable fastening arrangement is described in EP 0 612 635 A1. The fastener assembly comprises a receptable member, a connecting member and engagement means for retaining the connecting member to the receptable member upon relative movement in a first direction and for maintaining the retention whilst allowing a relative movement between the receptable member and the connecting member for a predetermined distance in a second direction perpendicular to the first direction. The connecting member becomes disengaged from the receptable member upon movement in the second direction beyond the predetermined distance.

DE 10 2010 005 309 A1 describes a cladding part with at least a fastening means for being fastened to a vehicle body. The fastening means is configured like a U-profile with legs protruding from a socket and being distanced from one another, engaging into corresponding recesses of the vehicle body in a form-fit, such as latching, manner. The legs are each provided with at least two latching elements arranged one after the other in axial direction, such, that the cladding part is configured with a tolerance at least in the X direction.

A latching arrangement, comprising a linear component and a base component, is described in EP 3 502 490 A1. The linear component is configured to be coupled to a first component and includes at least one retention protrusion. The base component is configured to be coupled to a second element and includes a channel and at least one retention feature. The linear component is configured to be slidably received within the channel of the base component and the at least one retention feature of the base component is configured to engage the at least one retention protrusion of the linear component to retain the linear component within the channel of the base component.

From DE 33 04 569 C1, a device for adjusting a first component relative to a second component is known, which may be for adjusting a door outer part of a vehicle with respect to the door body, wherein an adjusting in three directions is possible. The device allows the adjustment in case of closed vehicle doors, as the selected adjusting is preliminary fixed by means of the device, until a screwed-in screw secures the adjustment ultimately.

A base carrier with an elongated plastic lath is described in DE 10 2012 219 577 A1. It is based on a motor vehicle with a protective or decorative strip which is fastened by means of several plastic retention clips at the motor vehicle. The retention clips comprise an anchoring part and a coupling part which are moveable linearly with respect to one another. The intention is to create a base carrier with an elongated plastic lath that is arranged at the base carrier by means of at least two clip connections, wherein at least one clip connection allows a tolerance compensation. For this purpose, an elongated plastic lath is arranged at a base carrier by means of at least two clipped connections. In the portion of at least one of the clip connections, a short, undercutting guide rail is injected to the plastic lath, in which a sliding member is held in a form-fit manner so that it is movable in the longitudinal direction of the guide rail, only. Outside of the guide rail, the sliding element is connected as one piece with the retention clip that is clipped in at the base carrier.

A fastening arrangement with independent, three-dimensional tolerance compensation with a first component and a second component which is fixable to the first component by means of an assembly process with an automatic three-dimensional compensation of tolerances in the layer of the second component relative to the first component, is described in DE 10 2012 011 750 A1. The second component is movable in the direction of an assembly axis into a predetermined position relative to the first component by means of a bocking movement during the assembly process. Furthermore, the fastening arrangement includes a fastening device comprising a first and a second fastening element. The first fastening element comprises a rotationally mounted eccentric pin, the rotational axis of which is arranged eccentrically to a central longitudinal axis of the eccentric pin and parallel to the assembly axis. The second fastening element includes a receiving opening for the eccentric pin. During the bocking movement of the second component, the eccentric pin is positionable by means of a rotational movement in a vertical plane aligned perpendicular to the assembly axis so that the eccentric pin is insertable into the receiving opening. The second component is fixable in the predetermined position relative to the first component by means of an independently locking latching connection between the eccentric pin and the receiving opening.

WO 2017/205126 A1 describes a system for fastening a component to a fastening protrusion. A fastening device has a fastening element with a holding receptacle with holding means to hold the fastening protrusion and positive-locking elements. The component or an intermediate element arranged on the component has corresponding positive-locking elements. Prestressing means prestress the mutually corresponding positive-locking elements into positive engagement in a preassembled position of the fastening element on the component so that a lateral displacement of the fastening element relative to the component along a first direction of movement is prevented. The holding receptacle has a centering opening at least partially tapering in the insertion direction of the fastening protrusion so that the fastening protrusion is centered with respect to the holding receptacle of the fastening element with temporary positive-locking suppression of the mutually corresponding positive-locking elements, and with lateral displacement of the fastening element along the first direction.

Finally, a connection unit for connecting two components with a distance in between is known from WO 2020/088878 A1. The connecting unit for connecting a first component to a second component with a distance in between comprises a connection screw having a head in the form of a first ball segment and a shank extending therefrom, the shank comprising a first external thread of a first thread direction and a hollow-cylindrical base element. The hollow-cylindrical base element comprises a second external thread of a second thread direction adjacent to a first axial end for fastening in the first component and radially inwardly a first region with a first inner diameter. A through-opening with a second inner diameter which is smaller than the first inner diameter is provided at a second axial end. An outer side of the base element is designed in the form of a second ball segment. The first region and the through-opening are distanced axially from one another and are connected by a transition region which at least partly provides a bearing surface for the head of the connection screw. The shaft of the connecting screw extends through the through-opening. In this way, a pivoting of the connecting screw in a predetermined solid angle can be realized with respect to a longitudinal axis of the base element.

A disadvantage of the known arrangements is that the arrangements consist of several individual components, which is why the production is laborious and cost-intensive. Furthermore, a plurality of steps is necessary both for the production as well as for the assembling of the known arrangements.

It is therefore the object of at least some implementations of the present disclosure to provide a tolerance compensation element that is optimized compared to the state of the art, with which in a simple way, a reliable connection between two components with a distance in between can be provided. It is also an object of at least some implementations of the present disclosure to provide a first component with the tolerance compensation element, an associated connecting structure with the first and a second component, a corresponding production method as well as an associated connecting method.

SUMMARY

The above object is solved by a tolerance compensation element with which tolerances in the distance between a first and a second component can be compensated, a first component with the tolerance compensation element, a connecting structure of the first component and a second component, a production method for the tolerance compensation element as well as a connecting method. Advantageous embodiments and further developments arise from the following description, the drawings as well as the pending claims.

A tolerance compensation element with which tolerances in the distance between a first and a second component may be compensated, not automatically, include a thread bolt out of metal having a first drive feature, a first external thread of a first thread direction as well as a second external thread of a second thread direction, wherein between the first and the second external thread, a protrusion is provided extending from the thread bolt radially to the outside, a first plastic overmold in the portion of the first external thread, which provides a fastening structure for the fastening to the first component, and a second plastic overmold around the protrusion which extends radially to the outside and wherein the second plastic overmold may be formed plate-like, to provide an abutment portion abutting the second component when being in use, wherein a distance of the second plastic overmold to the first plastic overmold is changeable after overcoming a, particularly one-time increased, start-up torque or breakaway torque between the first plastic overmold and the first external thread in longitudinal direction of the thread bolt.

For the better comprehensibility, the tolerance compensation element is discussed as regards its use in a connecting structure.

The first plastic overmold encompasses the first external thread in a form-fit and force-fit manner. Thus, the fastening structure which is provided by the first plastic overmold is initially connected with the thread bolt in a transport-safe manner. With the fastening structure that is provided by the first plastic overmold, the tolerance compensation element is fastened to or in the first component. For example, when the fastening structure is provided in the form of a fulcrum slide, the fastening to a base element takes place at the first component provided for this purpose, with the base element comprising corresponding gliding rails. In case the fastening structure has the form of a bayonet lock, as it is principally known in the state of the art, a fastening takes place in a correspondingly configured opening in the first component. According to a further alternative, the fastening structure has the form of an adhesive pad with an adhesive surface for the fastening to the first component. All three possibilities will be described later with respect to the embodiments.

Independent from the specific designs of the fastening structure, it is necessary that it is fastenable in or to the first component in a way that a movement of the fastening structure in the longitudinal direction of the thread bolt is prevented. Likewise, a rotation of the fastening structure at or in the first component must be prevented so that after overcoming the start-up torque or breakaway torque, a relative rotation between fastening structure and thread bolt can be realized.

After the tolerance compensation element has been fastened to or in the first component by means of the first plastic overmold, the second component is arranged in the distance to the first component. In order to now compensate the tolerances in the distance between the first and the second component, the thread bolt is rotated by means of the first drive feature. This takes place manually or by means of a machine, as for example a corresponding tool or automatic machine. This shows that the tolerance compensation does not take place automatically or independently by means of the tolerance compensation element.

In order to rotate the thread bolt and to be able to change the distance of the second plastic overmold to the first plastic overmold, the connection between the first external thread and the first plastic overmold must be released, which is possible after overcoming the corresponding start-up or breakaway torque. The amount of the necessary breakaway torque may be influenced by the thread form of the first external thread. The value for the start-up or breakaway torque may lie at a maximum of 3.5 Nm. In at least some implementations, the value for the start-up or breakaway torque may lie between 1.5 and 3.0 Nm.

After overcoming the start-up or breakaway torque, the thread bolt is rotated relative to the fastening structure so that the abutment portion is displaced relative to the fastening structure. For this displacing, after initially and onetime overcoming the start-up torque, an inhibiting torque must be overcome which is smaller than the start-up torque. The inhibiting torque may be 10% to 20% of the initial start-up torque. With respect to the above values for the start-up torque, the inhibiting torque may lie at a maximum of 0.35 to 0.7 Nm and may be between 0.15 and 0.6 Nm in at least some implementations.

Regarding the distance between the second plastic overmold to the first plastic overmold, it is measured between a side of the second plastic overmold facing the first plastic overmold and a side of the first plastic overmold facing the second plastic overmold. Usually, in the production, there is a distance between the first and the second plastic overmold caused by the tool. The change of the distance can therefore be both an increase of the distance as well as a reduction of the distance. In an extreme position, the distance is zero, i.e. the first and the second plastic overmold abut one another. Provided that no tool-caused distances arise in the production of the tolerance compensation element, the initial distance can therefore also be zero. As in this case, the first and the second plastic overmold abut one another, a further decrease of the distance is not possible.

According to a first example, the thread bolt is rotated counter-clockwise in case of an exemplary right-handed thread as the first external thread. After overcoming the start-up torque, the distance between the abutment portion that is formed by the second plastic overmold and the fastening structure is changed in case of a rotation. For this purpose, the inhibiting torque which is smaller in comparison with the start-up torque must be overcome. This takes place until the abutment portion abuts the second component. Subsequently, the second component and the tolerance compensation element are fixed in this position by for example screwing a nut, which matches the second external thread, onto the second external thread.

According to a second example, the rotating of the thread bolt takes place clockwise. This changes the distance of the second plastic overmold to the first plastic overmold, too, wherein in contrast to the above example, an already present distance between the abutment portion and the fastening structure is reduced. This can take place at most up to the point at which the second plastic overmold abuts the first plastic overmold. In this case, the axial end, which is present adjacent to the first external thread, can project from the first plastic overmold.

The above explanations apply analogously to an exemplary left-handed thread as the first external thread.

In this context, the first thread direction of the first external thread and the second thread direction of the second external thread may be the same. Alternatively, the first thread direction of the first external thread and the second thread direction of the second external thread may be contrary.

An advantage of the tolerance compensation element is that in the initial state, it is present as a one-part tolerance compensation element. Only after overcoming the start-up torque or breakaway torque between the fastening structure and the first external thread, a two-part tolerance compensation element is present. Thus, both the steps for producing the tolerance compensation element as well as for establishing a connection between two components with the tolerance compensation element are reduced compared with the state of the art, also having a positive effect on the production costs. Therefore, compared with known tolerance compensation elements, the tolerance compensation element is optimized while guaranteeing same properties in the later component connection.

According to further embodiment of the tolerance compensation element, the first plastic overmold may have the form of a fulcrum slide or of a bayonet lock or of an adhesive pad. With regard to the design of the fastening structure or the first plastic overmold as fulcrum slide, the same is fastened in a base element fastened to the first component. The base element is made up of a bottom as well as three lateral walls having a protrusion reaching to the inside parallel to the bottom for securing the fulcrum slide inside. The fulcrum slide is slid into the base element from the open side parallel to the bottom or parallel to the surface of the first component, respectively. The plane in which the fulcrum slide is slid into the base element is also referred to a sliding plane. The later displacing of the thread bolt relative to the fastening structure therefore takes place perpendicularly with respect to the sliding plane, i.e. the plane which is aligned parallel to the bottom of the base element or parallel to the surface of the first component, respectively.

The fastening of the fulcrum slide in the base element takes place by means of a corresponding latching structure, which may be by means of the interacting of a grooved structure at the base element with an axial protrusion that is provided at the fulcrum slide. The base element and the fulcrum slide are adapted to one another in terms of their dimensions so that a rotating of the fulcrum slide relative to the base element is prevented. An axial pulling-out of the fulcrum slide from the base element is prevented as the protrusion of the base element projecting to the inside parallel to the bottom engages into a corresponding guide recess of the fulcrum slide.

The above explanations analogously apply to the first plastic overmold configured as bayonet lock as fastening structure. For example, in this case, the first component comprises a key hole which is engaged by the bayonet structure. After a locking of the bayonet structure in the key hole, the tolerance compensation element is secured against a pulling-out from the first component in the longitudinal direction of the thread bolt. Furthermore, a protection against a rotating in at least a first rotation direction takes place, e.g. in the first thread direction. Alternatively, a protection against a rotating in the second rotation direction is provided. Depending on the configuration of the anti-rotation protection, i.e. the direction in which the anti-rotation protection prevents a rotating, the applying of the start-up torque or breakaway torque takes place in the respective rotation direction. After overcoming the start-up torque or breakaway torque, the thread bolt can be displaced by means of the first drive feature, as described above.

The above explanations apply in the same manner to the first plastic overmold which is configured as an adhesive pad as fastening structure. The adhesive pad may comprise a form of the side facing away from the second plastic overmold which matches a surface of the first component. This side is also referred to as adhesive surface. For example, the adhesive surface can be configured planar. Alternatively, recesses for receiving an adhesive means can be provided and/or protrusions in order to provide a defined distance between the adhesive surface and the first component can be provided. The corresponding adhesive means is chosen depending on the application field and can be a light-curing adhesive, for example in case the adhesive pad is configured out of a light-transmissive material. Alternatively, the adhesive means can be a two-component adhesive means or the like.

An advantage of this configuration is the safe fastening of the tolerance compensation element in the first component in the longitudinal direction of the thread bolt. Furthermore, the fastening structure is secured against a rotating, so that the startup torque or breakaway torque for releasing the connection can be applied in a process-safe manner between the first external thread and the first plastic overmold. Beside the above-described exemplary embodiments, each structure can serve as fastening structure, which fulfil these criteria in case of a fastening to or in the first component.

According to a further embodiment of the tolerance compensation element, the first external thread may be configured in a thread-grooving manner and with an asymmetrical flank structure of the thread. A side of the thread flank of the first external thread, the side facing the second plastic overmold may enclose, with a reference line extending perpendicularly to the longitudinal axis of the tolerance compensation element and through the tip of the thread flank, an angle α which lies in the range from 7° to 12°. According to a first alternative, a side, facing away from the second plastic overmold, of the thread flank may enclose with the reference line an angle β which lies in the range from 15° to 25°. In another alternative, the side, facing away from the second plastic overmold, of the thread flank may have a radius r which lies in the range of 0.2-fold to 0.25-fold of the thread inner diameter. Due to this thread form, on the one hand, a reliable connection between the first external thread and the first plastic overmold is provided during the production. On the other hand, it is guaranteed that a releasing of the connection between the first plastic overmold and the first external thread can be realized without destroying the function of the fastening structure.

Advantageously, the first drive feature of the tolerance compensation element is arranged on the axial end which is adjacent to the second external thread. By that, in case of an only one-sided accessibility of the tolerance compensation element, a displacing of the tolerance compensation element may be provided reliably. According to an alternative, the first drive feature is an outer drive feature. According to a second alternative, the first drive feature is configured as an inner drive feature.

In a further embodiment of the tolerance compensation element, a second drive feature is furthermore provided that may be arranged adjacent to the first external thread. In this way, a drive feature is provided on both axial ends of the thread bolt. Thus, the flexibility of the tolerance compensation element is further increased. The second drive feature may be an inner drive feature.

In the case in which the tolerance compensation element includes only a first drive feature adjacent to the second external thread, the axial end of the thread bolt is, adjacent to the first external thread, at least partially encompassed which may be by the first plastic overmold. Thus, in the initial state, the first and the second plastic overmold are already at a minimum distance, causing the length of the tolerance compensation element to be held as short as possible in the initial state. This may be advantageous with regard to the room required for a transport of the tolerance compensation element.

In a further advantageous embodiment of the tolerance compensation element, the abutment portion formed by the second plastic overmold comprises a sealing element on a side facing the second component, which may be a crimping rip or several crimping rips. Thus, compared with the state of the art, a sealing function of the tolerance compensation element is not provided by a separate element. Rather, the corresponding function is already integrated in the tolerance compensation element. This reduces the number of separate parts of the tolerance compensation element further, which also facilitates the production and use.

The first and the second plastic overmold of the tolerance compensation element may be formed from the same plastic material or different plastic materials. The forming from the same plastic material has the advantage that the tolerance compensation element can be produced more cost-effective. In turn, the use of two different plastic materials allows a better adaption to the respective application situation. An example for a plastic material for the first and/or second plastic overmold is PA6 GF 30.

The tolerance compensation element may be fastened to a first component. With regard to the technical effects and advantages arising from that, reference is made to the above explanations regarding the tolerance compensation element in order to avoid repetitions.

In a further embodiment of the first component, the fastening of the tolerance compensation element with the first plastic overmold may take place by means of a correspondingly configured base element at the first component or a correspondingly designed opening in the first component.

The base element can be fastened to the first component by means of adhesion, screwing-on or the like. With regard to this embodiment, reference may be made to the above explanations regarding the configuration of the fastening structure as fulcrum slide or bayonet lock.

A connecting structure consists of the first component as well as a second component so that the tolerance compensation element with the first plastic overmold is fastened to or in the first component and abuts the second component with the abutment portion, wherein a fastening of the second component takes place by means of a nut, which engages with the second external thread. With regard to the connecting structure, too, reference is made to the above explanations regarding the tolerance compensation element in order to avoid repetitions.

A production method for a tolerance compensation element includes the steps: providing a thread bolt of metal comprising a first drive feature, a first external thread of a first thread direction as well as a second external thread of a second thread direction, wherein a protrusion is provided between the first and the second external thread extending from the thread bolt radially to the outside, overmolding the portion of the first external thread with a first plastic material, wherein the first plastic overmold provides a fastening structure for the fastening to the first component, and overmolding of the protrusion which extends radially to the outside with a second plastic material, wherein the second plastic overmold provides an abutment portion which in use abuts the second component and may be configured plate-like. The tolerance compensation element is producible with the production method. For this reason, reference is also made to the arising technical effects and advantages regarding the tolerance compensation element.

In a further embodiment of the production method, the first and the second plastic material may be the same or different. As explained above, the use of the same plastic material has the advantage that the tolerance compensation element is producible more cost-effective. In turn, the use of two different plastic materials allows a better adaptability to the respective application situation. An example for a plastic material for the first and/or second plastic overmold is PA6 GF 30.

The connecting method of a first component with a second component by means of a tolerance compensation element includes the steps: fastening the tolerance compensation element to the first component by means of the first plastic overmold, arranging the second component with a distance to the first component, overcoming a start-up torque between first plastic overmold and first external thread as well as rotating the thread bolt until the abutment portion which is formed by the second plastic overmold abuts the second component and after that, screwing-on a nut on the second external thread so that the second component is fastened with a distance to the first component. The connecting structure is provided with the connecting method by using the tolerance compensation element. Therefore, reference is also made to the above explanations regarding the arising technical effects and advantages.

BRIEF DESCRIPTION OF THE DRAWINGS

In the following, the present disclosure will be described in detail with reference to the drawings. In the drawings, the same reference signs denote the same components and/or elements. It shows.

DETAILED DESCRIPTION

Figure 1:
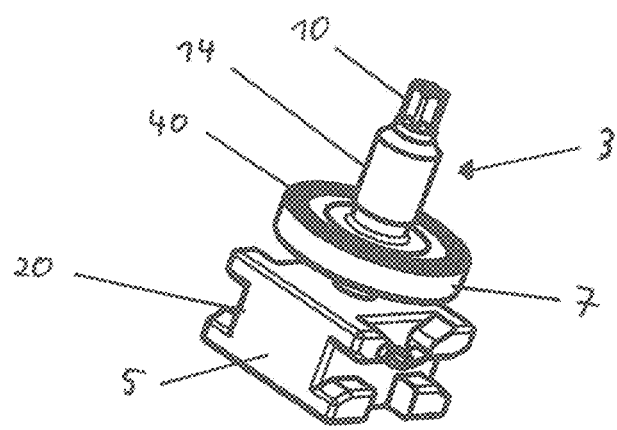
FIG. 1 a perspective view of an embodiment of a tolerance compensation element.
Figure 2:
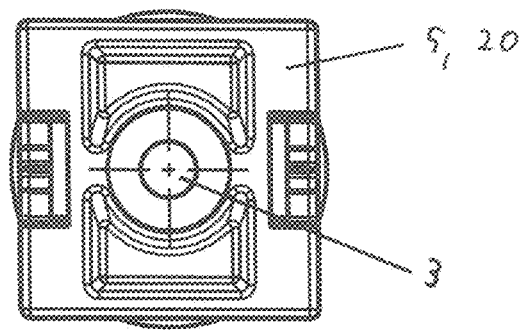
FIG. 2 a view of the embodiment of the tolerance compensation element of FIG. 1 from below, FIG. 3 a first lateral view of the embodiment of the tolerance compensation element of FIG. 1, FIG. 4 a second lateral view of the embodiment of the tolerance compensation element of FIG. 1, FIG. 5 an enlarged lateral view of the portion Y encircled in FIG. 4, FIG. 6 a top view of the embodiment of the tolerance compensation element of FIG. 1, FIG. 7 a sectional view of the embodiment of the tolerance compensation element of FIG. 1 along the line A-A in FIG. 6, FIG. 8 an enlarged view of the portion X encircled in FIG. 7, FIG. 9 a perspective view of a thread bolt, FIG. 10 a top view on the thread bolt of FIG. 9, FIG. 11 a lateral view of the thread bolt of FIG. 9, FIG. 12 an enlarged view of a part of the radial protrusion of the thread bolt of FIG. 9, FIG. 13 an enlarged sectional view of the thread bolt in the portion of the first external thread for clarifying a first embodiment of the thread flank structure, FIG. 14 an enlarged sectional view of the thread bolt in the portion of the first external thread for clarifying a second embodiment of the thread flank structure, FIG. 15 a top view of an embodiment of a base element for fastening the tolerance compensation element to a first component, FIG. 16 a lateral view of the base element of FIG. 15, FIG. 17 an enlarged sectional view along the line D-D of FIG. 16 for illustrating the latching structure of the base element, FIG. 18 a perspective view of the tolerance compensation element according to FIG. 1, inserted into the base element of FIG. 15, FIG. 19 an illustration of the course of the necessary torque in order to change the distance of the second plastic overmold to the first plastic overmold, FIG. 20 an embodiment of a first component, FIG. 21 a sectional view of the tolerance compensation element during a first assembly state, in which the second plastic overmold is distanced from the second component, FIG. 22 a sectional view of the tolerance compensation element during a second assembly state in which the second plastic overmold abuts the second component, FIG. 23 a sectional view of an embodiment of a fastening structure, FIG. 24 a schematic course of procedure of an embodiment of a production method of a tolerance compensation element, and FIG. 25 a schematic course of procedure of an embodiment of a connecting method.

In the following, an embodiment of a tolerance compensation element 1 is explained with which tolerances in the distance between a first component A and a second component B can be compensated. Corresponding applications can for example be found in the sector of the automotive industry when an add-on part is intended to be fastened to a structural component.

The embodiment of the tolerance compensation element 1 is explained with respect to FIGS. 1 to 8. The tolerance compensation element 1 includes a thread bolt 3 out of metal, a first plastic overmold 5 as well as a second plastic overmold 7. The first 5 and the second plastic overmold 7 can be made of the same plastic or of different plastic materials. The configuration out of the same plastic material has the advantage that the tolerance compensation element 1 can be produced more easily and therefore more cost effective. In turn, the use of two different plastic materials allows a better adaptability to the respective application situation. An example for a plastic material for the first 5 and/or second plastic overmold 7 is PA6 GF 30.

The thread bolt 3 out of metal which is shown in detail in FIGS. 9 to 12 comprises a first drive feature 10, a first external thread 12 of a first thread direction as well as a second external thread 14 of a second thread direction, wherein the second external thread 14 is only schematically shown. A protrusion 16 extending radially from the thread bolt 3 to the outside is provided between the first 12 and the second external thread 14.

In this context, the first thread direction of the first external thread 12 and the second thread direction of the second external thread 14 may be the same. Alternatively, the first thread direction of the first external thread 12 and the second thread direction of the second external thread 14 may be contrary to one another.

Figure 13:
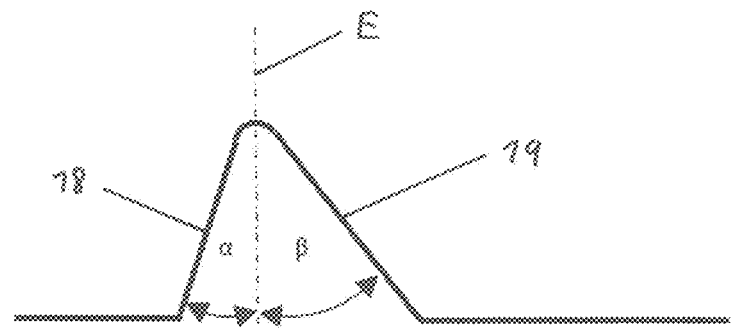
Figure 14:
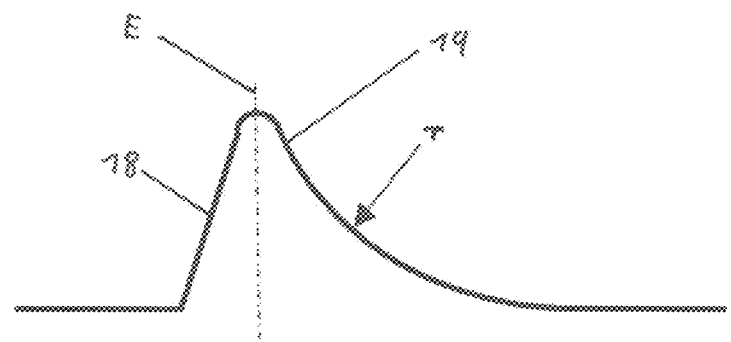

The first external thread 12 is configured in a thread-grooving manner and asymmetrically with regard to the flank profile. As can be seen from FIG. 13, a side 18, facing the second plastic overmold 7, of the thread flank encloses an angle α in the range from 7° to 12° with a reference line E extending perpendicularly to the longitudinal axis of the tolerance compensation element 1 and through the tip of the thread flank. A side 19, facing away from the second plastic overmold 7, of the thread flank encloses an angle β in the range from 15° to 25° with the reference line E. In another alternative, which is shown in FIG. 14, the side 19 of the thread flank facing away from the second plastic overmold 7 may comprise a radius r lying in the range of the 0.2 fold to 0.25 fold of the thread nominal diameter. As an example, the first external thread 12 is a Remform or a Remform II thread. The first plastic overmold 5 is provided in the portion of the first external thread 12, which provides the fastening structure 20 for fastening the tolerance compensation element 1 to the first component A.

Due to the thread form of the first external thread 12, on the one hand, a reliable connection between the first external thread 12 and the first plastic overmold 5 is provided during the production. On the other hand, it is guaranteed that a releasing of the connection between the first plastic overmold 5 and the first external thread 12 can be realized without destroying the function of the fastening structure 20 after overcoming a start-up torque L (see FIG. 19).

The second external thread 14 later serves for fastening the second component B, for example by means of a nut 60 which is in engagement therewith.

The first drive feature 10 of the tolerance compensation element 1 is arranged at the axial end that is adjacent to the second external thread 14. By that, a displacement of the tolerance compensation element 1 may be provided reliably, in case of an accessibility to the tolerance compensation element 1 from one side, only. According to an alternative, the first drive feature 10 is an outer drive feature, as for example the illustrated hexalobular external engagement feature or the external torx. An external hex or the like can certainly also be used. According to a second alternative, the first drive feature is configured as inner drive feature. Similarly, the first drive feature 10 can also be provided at the axial end which is adjacent to the first external thread 12.

In a further alternative, a second drive feature (not shown) is additionally provided. It is arranged at the axial end of the thread bolt 3 opposing the first drive feature 10, for example and with respect to the illustrated embodiment of the tolerance compensation element 1 adjacent to the first external thread 12. In this way, a drive feature is provided at both axial ends of the thread bolt 3. Thus, the field of application of the tolerance compensation element 1 is further increased. Due to the first plastic overmold 5 which is provided in the portion of the first external thread 12, the second drive feature may be an inner drive feature.

As has already been indicated above, the first plastic overmold 5 is provided in the portion of the first external thread 12. The first plastic overmold 5 provides a fastening structure 20 for fastening the tolerance compensation element 1 to the first component A. The first plastic overmold 5 and the first external thread 12 can be released from one another after overcoming a start-up torque L. After overcoming this initial start-up toque or breakaway torque L, which may be influenced by the thread geometry of the first external thread 12 and which can also be referred to as predetermined breaking torque, an inhibiting torque H must be overcome in order to rotate the thread bolt 3 relative to the first plastic overmold 5. This inhibiting torque H corresponds to a remaining friction torque between the first plastic overmold 5 and the first external thread 12 of the thread bolt 3.

The second plastic overmold 7 is formed around the protrusion 16, which extends radially outwardly, of the thread bolt 3 and may have the form of a plate or a disc. The second plastic overmold 7 provides an abutment portion 40 which abuts the second component B in use. The abutment portion 40 which is formed by the second plastic overmold 7 includes a sealing element on a side facing the second component B, here two crimping rips 42. Compared with the state of the art, a sealing function of the tolerance compensation element 1 is thereby not provided by means of a separate element. Rather, the corresponding function is already integrated in the tolerance compensation element 1. This reduces the number of separate parts of the tolerance compensation element 1 further, so that the production and the use are made easier.

A distance is present between the first 3 and the second plastic overmold 5 in the longitudinal direction of the thread bolt 3. On the one hand, it is caused by the fact that the distance between abutment portion 40 and fastening structure 20 must be changeable, so that the tolerance compensation element 1 can fulfil its function. On the other hand, it is caused by the tool so that a certain minimum level must not be fallen short of.

In the case in which the tolerance compensation element 1 only comprises a first drive feature adjacent to the second external thread 14, the axial end of the thread bolt 3 adjacent to the first external thread 12 is at least partly encompassed preferably by the first plastic overmold 5. Thus, the first 5 and the second plastic overmold 7 are already at a minimum distance in the initial state, causing the length of the tolerance compensation element 1 in the initial state to be kept as low as possible. This may be advantageous with regard to the space needed during a transport of the tolerance compensation element. The same applies analogously when the axial end of the thread bolt 3 adjacent to the first external thread 12 is not encompassed by the first plastic overmold 5. In this case, an opening is present so that the thread bolt can project from the same, too, after correspondingly rotating it relative to the fastening structure 20.

In the initial state, the first plastic overmold 5 encompasses the first external thread 12 in a form-fit and force-fit manner. Due to the overmolding of the first external thread 12 by the first plastic overmold 5, the provided fastening structure 20 is connected with the thread bolt 3 in a transport-safe manner. With the fastening structure 20 provided by the first plastic overmold 5, the tolerance compensation element 1 is fastened to or in the first component A. In the present case, the fastening structure 20 has the form of a fulcrum slide.

The fulcrum slide as fastening structure 20 has the basic shape of a cuboid, which may be with a longitudinal side and a comparably shorter transverse side. Four outwardly projecting protrusions 22 are provided on the longitudinal sides neighboring the corners of the respective longitudinal sides, the protrusions extending perpendicularly with respect to the longitudinal direction of the thread bolt 3. Thus, a guide recess 28 is formed between the protrusions 22, extending in a plane perpendicular to the longitudinal axis of the thread bolt.

The two protrusions 22, which are provided adjacent to the side of the fastening structure 20 which faces the abutment portion 40, are connected by means of a web 24. An axial protrusion 26, which extends in axial direction away from the abutment portion 40 and engages a groove structure 58 of a base element 50 in use, is provided at the web 24. On the ends which face the transverse sides, the protrusions 22 comprise a sloped intake surface so that an inserting of the fastening structure 20 into the base element 50 is facilitated. Furthermore, due to this geometry, no attention must be paid to the orientation of the fastening structure 20 when the tolerance compensation element 1 with the fulcrum slide as fastening structure 20 is inserted into the base element 50.

Figure 15:
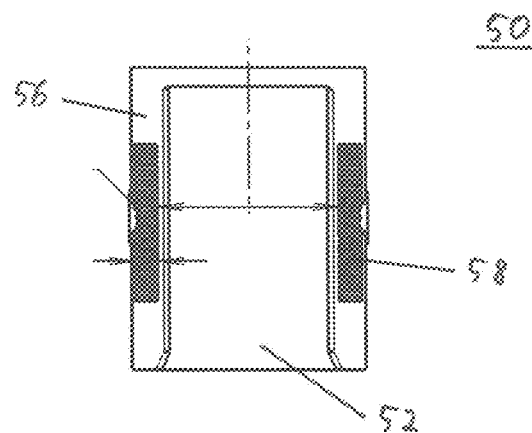
Figure 16:
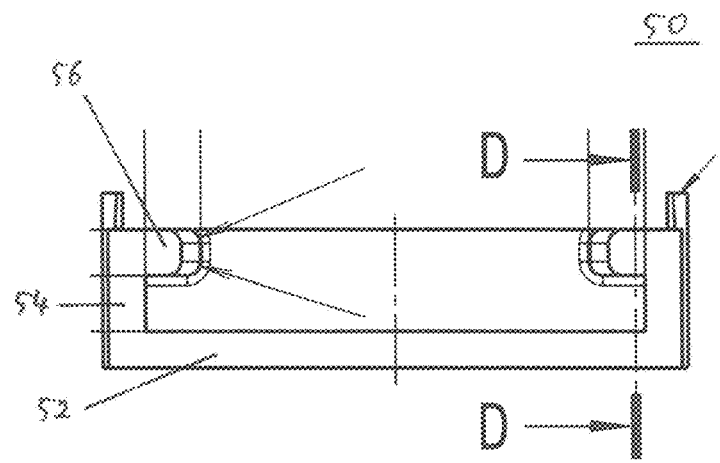
Figure 17:
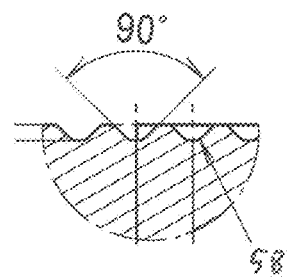

An associated base element 50 which is fastened to the first component A by means of, for example, adhesion, screwing or the like and which serves for receiving the fulcrum slide is shown in FIGS. 15 to 17.

The base element 50 consists of a bottom 52 as well as three lateral walls 54 having a protrusion 56 projecting to the inside parallel to the bottom 52 for securing the fulcrum slide inside. The fulcrum slide is slid into the base element 50 from the open side parallel to the bottom 52 or parallel to the surface of the first component A, respectively. The plane in which the fulcrum slide is slid into the base element 50 is also referred to as sliding plane. The later adjustment of the thread bolt 3 relative to the fastening structure 20 formed by the first plastic overmold 3 thus takes place perpendicularly with respect to the sliding plane, i.e. the plane that is aligned parallel to the bottom 52 of the base element 50 or parallel to the surface of the first component A, respectively.

The fastening of the fulcrum slide or the fastening structure 20 formed by the first plastic overmold 5, respectively, in the base element 50 takes place by means of a corresponding latching structure. For this purpose, the grooved structure 58 at the base element 50 interacts with the axial protrusion 26 provided at the fulcrum slide. The base element 50 and the fulcrum slide as fastening structure 20 are adapted to one another in terms of their dimensions such, that a rotating of the fulcrum slide relative to the base element 50 is prevented. An axial pulling-out of fulcrum slide from the base element 50 is prevented as the protrusion 56 of the base element 50 which projects parallel to the bottom engages into the corresponding guide recess 28 of the fulcrum slide. In this context, reference is made to the representation of FIG. 18, which shows the tolerance compensation element 1 arranged in the base element 50.

Alternatively to the design of the fastening structure 20 as a fulcrum slide, a design in the form of a not-shown bayonet lock can be realized as well, as is generally known in the state of the art. The fastening of such a bayonet lock takes place in a correspondingly configured opening in the first component A. For example, the first component A includes a key hole in this case, into which the bayonet structure engages. After a locking of the bayonet structure in the keyhole, the tolerance compensation element 1 is secured in the longitudinal direction of the thread bolt 3 against a pulling-out from the first component A. Furthermore, a security against a rotating in at least a first rotation direction, e.g. in the first thread direction, takes place. Alternatively, a security against rotating in the second rotation direction is provided. Depending on the configuration of the anti-rotation protection, i.e. the direction in which the anti-rotation protection prevents a rotating, an applying of the start-up torque L in the corresponding rotation direction takes place. After overcoming of the start-up torque L, the thread bolt 3 can be adjusted by means of the first drive feature 10 as described above.

According to another possibility, the fastening structure 20 is implemented in the form of an also not-shown adhesive pad, the above explanations apply correspondingly to the first plastic overmold 5, formed as an adhesive pad, as a fastening structure 20. On the side which may face away from the second plastic overmold 7, the adhesive pad has a shape which matches a surface of the first component A. This side is also referred to as adhesive face. The adhesive face can for example be configured plane. Alternatively, recesses for receiving an adhesive can be provided and/or protrusions in order to provide a defined distance between the adhesive face and the first component A. The corresponding adhesive is chosen depending on the field of application and can be a light-curing adhesive, e.g. when the adhesive pad is made of a light-transmissive material. Alternatively, the adhesive can be a two-component adhesive or the like.

Regardless of the precise configuration of the fastening structure 20, it is necessary that it is fastened in or to the first component A such, that a movement of the fastening structure 20 in the longitudinal direction of the thread bolt 3 is prevented. Likewise, a rotation of the fastening structure 20 on or in the first component A must be prevented so that, after overcoming the start-up torque L, a relative rotation between fastening structure 20 and thread bolt 3 can be implemented.

For the better comprehensibility, the tolerance compensation element 1 is now discussed in connection with its use in a connecting structure with reference to FIGS. 20 to 23.

Figure 20:
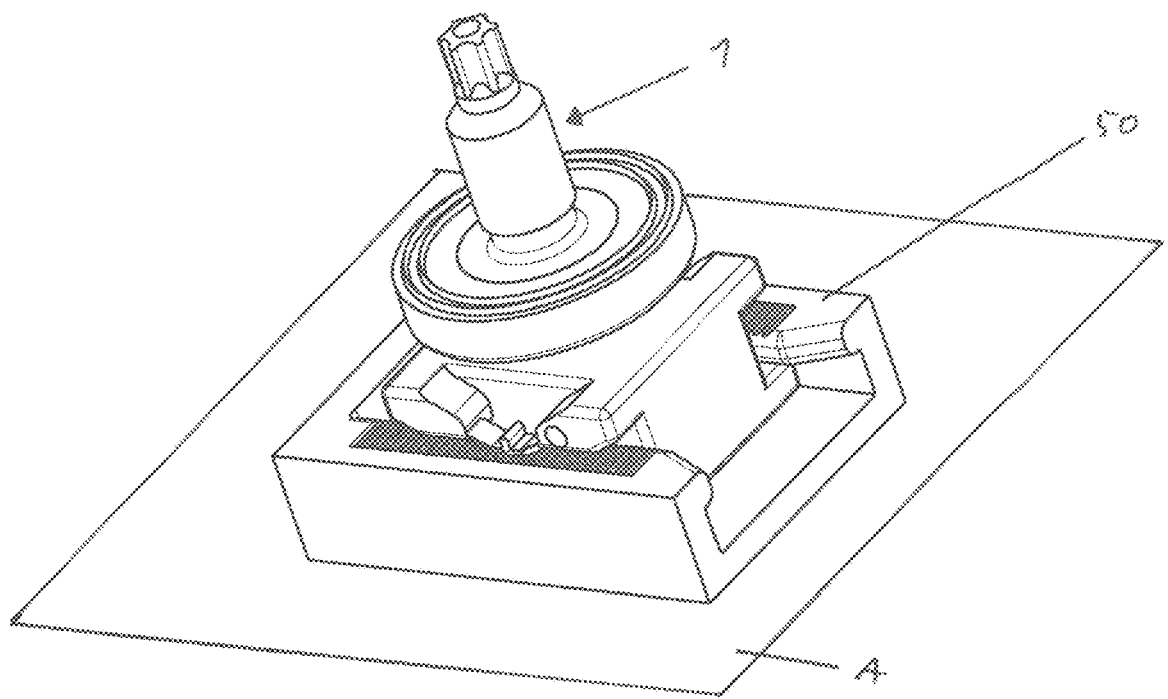
Figure 21:
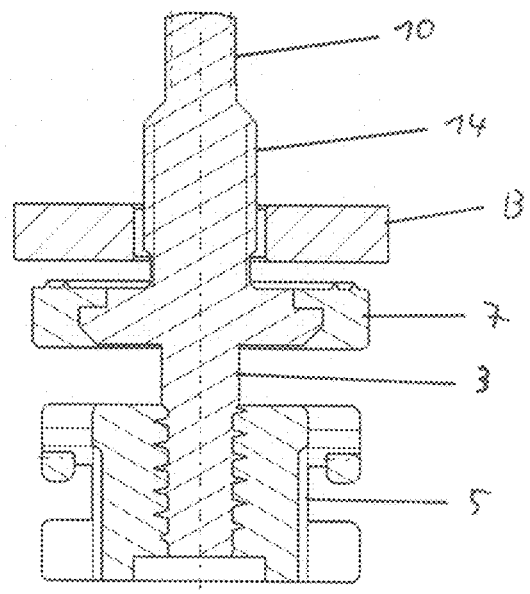

Once the tolerance compensation element 1 has been fastened to or in the first component A by means of the fastening structure 20 formed by the first plastic overmold 5, as is shown in FIG. 20, the second component B is arranged at a distance to the first component A. This is schematically shown in FIG. 21. Now, in order to compensate the tolerance in the distance between the first A and the second component B, the thread bolt 3 is rotated by means of the first drive feature 10. This takes place manually or by means of a machine, as for example a corresponding tool or automatic machine. It becomes obvious from that that the tolerance compensation does not take place automatically or in a self-acting manner, respectively, by means of the tolerance compensation element 1.

Figure 19:
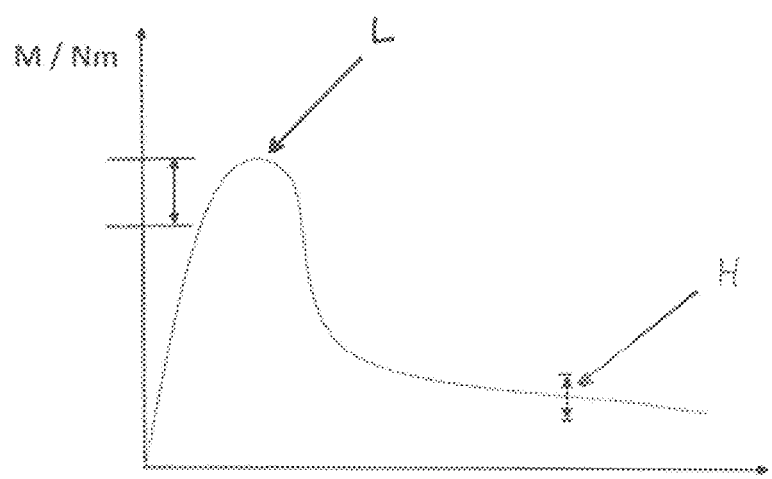

In order to rotate the thread bolt 3 and thereby be able to change a distance D of the second plastic overmold 7 to the first plastic overmold 5, the connection between the first external thread 12 and the first plastic overmold 5 must be released, which is possible after overcoming the respective start-up torque L (cf. FIG. 19). The start-up torque L may be influenced by the thread form of the first external thread 12, with the start-up torque L amounting to at most 3.5 Nm. Values for the start-up torque or the breakaway torque may lie in the range from 1.5 to 3.0 Nm.

After overcoming the start-up torque or breakaway torque, the thread bolt 3 is rotated relative to the fastening structure 20, causing a displacement of the abutment portion 40 relative to the fastening structure 20. For this displacing, an inhibiting torque H must be overcome which is smaller than the start-up torque L which has been increased initially and one-time with respect to the inhibiting torque H and may lie in the range from 10% to 20% of the start-up torque. With respect to the above values for the start-up torque, the inhibiting torque therefore may lie at a maximum of 0.35 to 0.7 Nm and may be between 0.15 and 0.6 Nm in at least some implementations.

Figure 3:
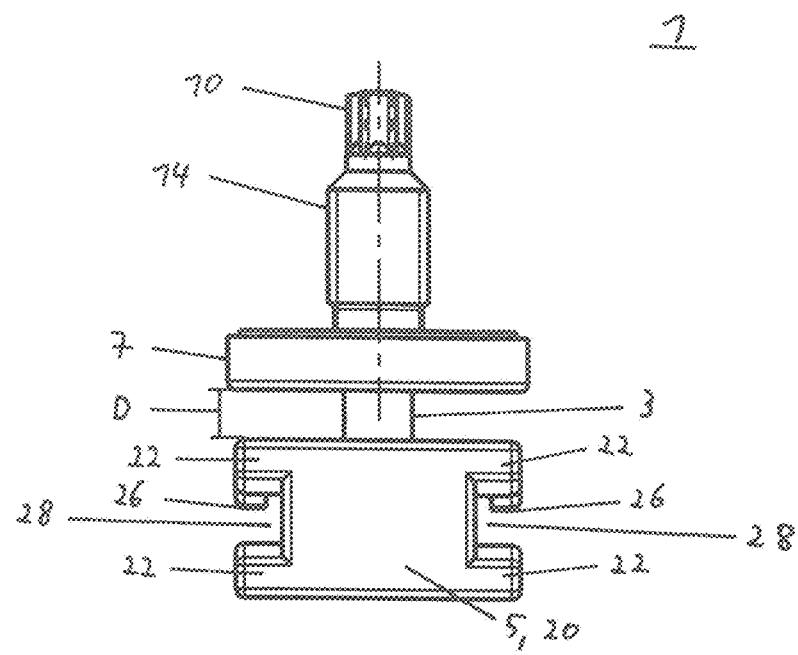
Figure 4:
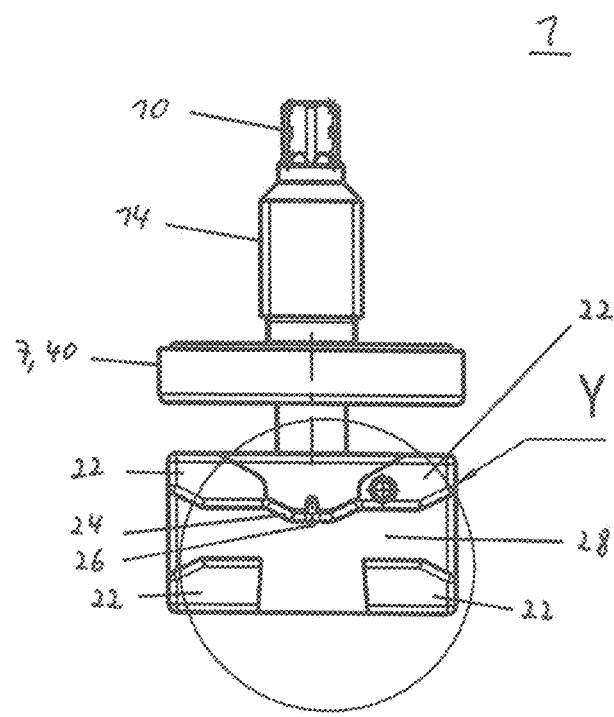
Figure 5:
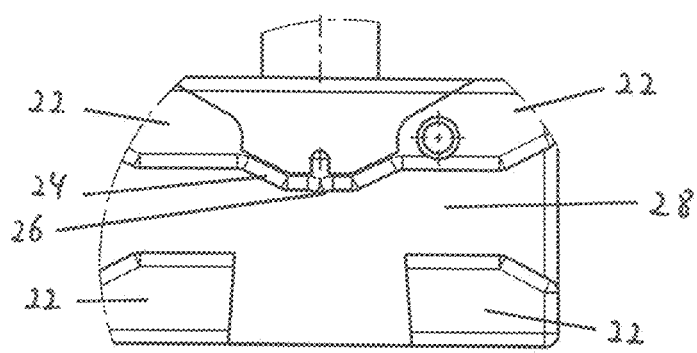
Figure 6:
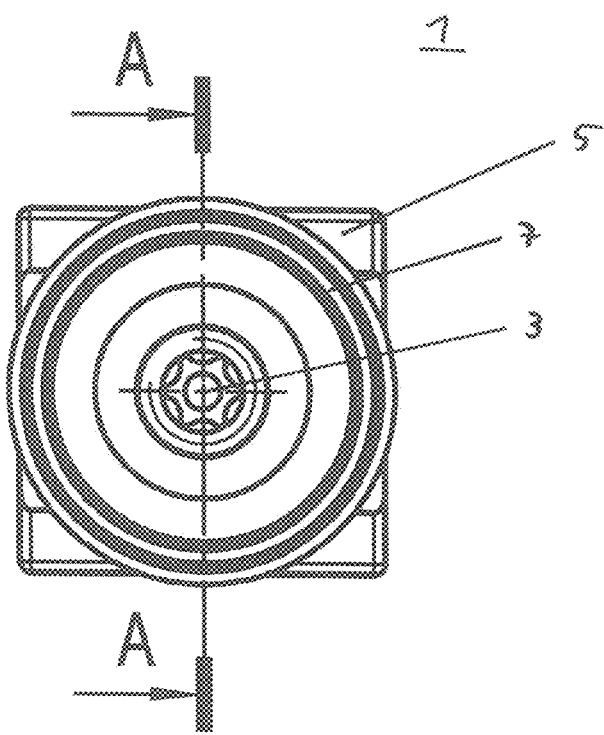
Figure 7:
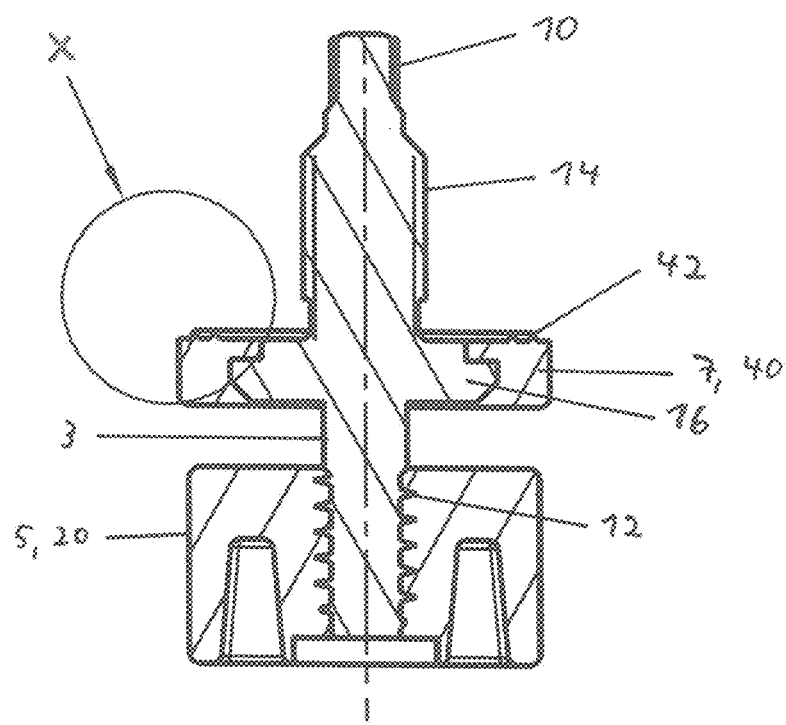
Figure 8:
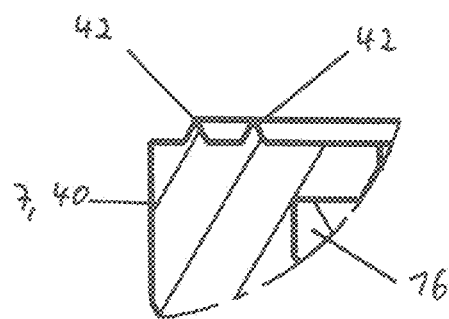
Figure 9:
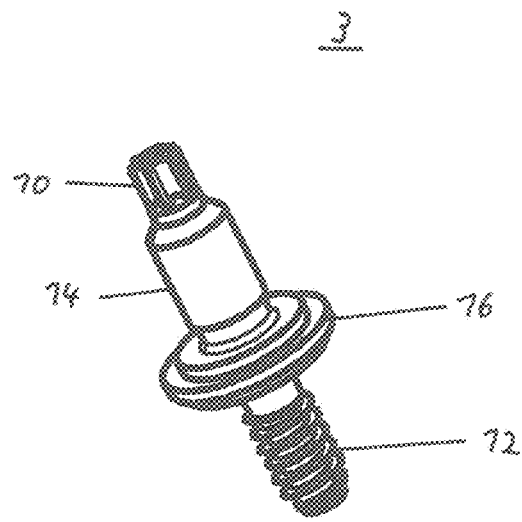
Figure 10:
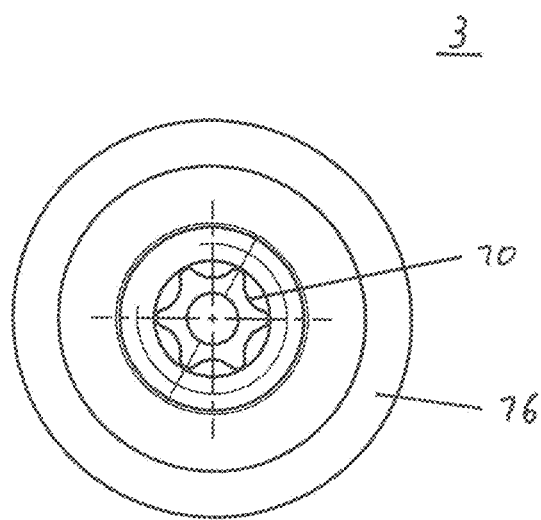
Figure 11:
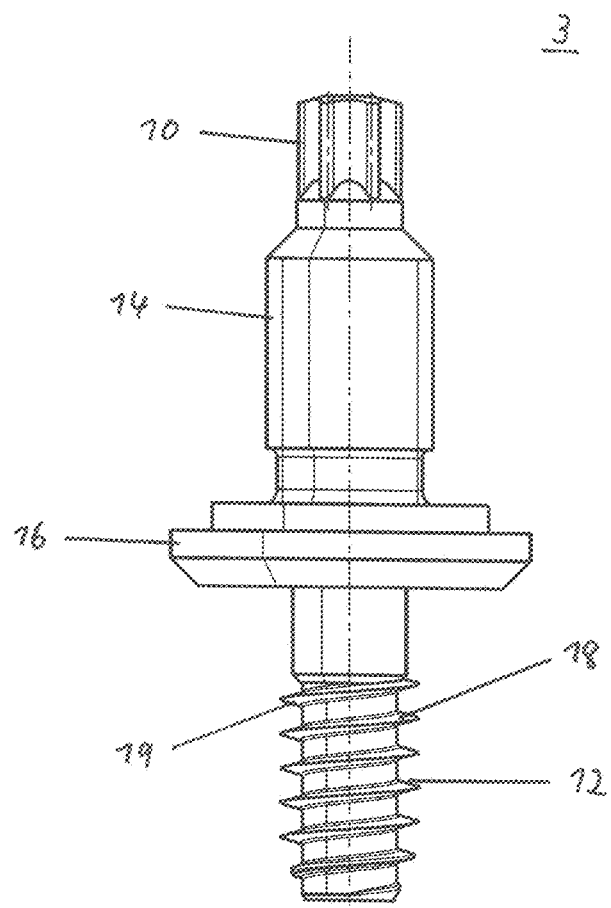
Figure 12:
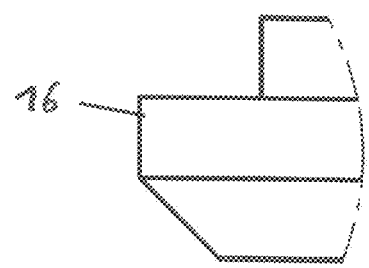

The distance D of the second plastic overmold 7 to the first plastic overmold 5 is measured between a side of the second plastic overmold 7, facing the first plastic overmold 5, and a side of the first plastic overmold 5, facing the second plastic overmold 7, as is shown in FIG. 3. In the shown embodiment, there is a tool-caused distance D between the first 5 and the second plastic overmold 7 during the production. Changing the distance D can therefore mean both an increase of the distance D as well as a decrease of the distance D, which may be when the first plastic overmold 5 does not encompass the axial end of the thread bolt 3 adjacent to the first external thread 12 at the face side. Therefore, a decrease of the distance D is possible until abutment of the first 5 and the second plastic overmold 7 to one another, so that the distance would be zero. Provided that no tool-caused distance D results during the production of the tolerance compensation element, the initial distance D can also be zero. An increase of the distance D is possible as long as the thread bolt 3 with the first external thread 12 is not held process-safe in the fastening structure 20.

Figure 22:
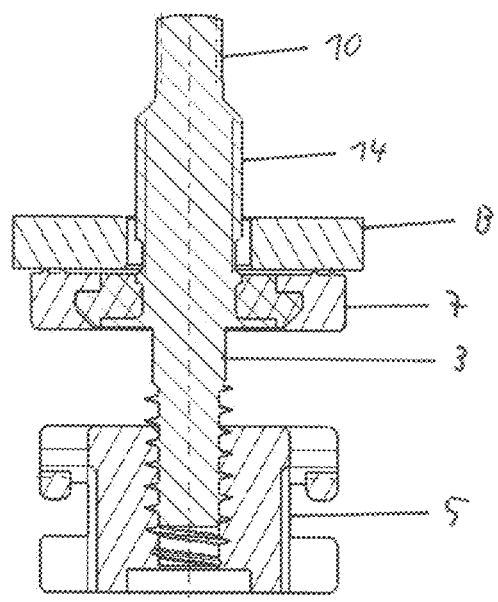
Figure 23:
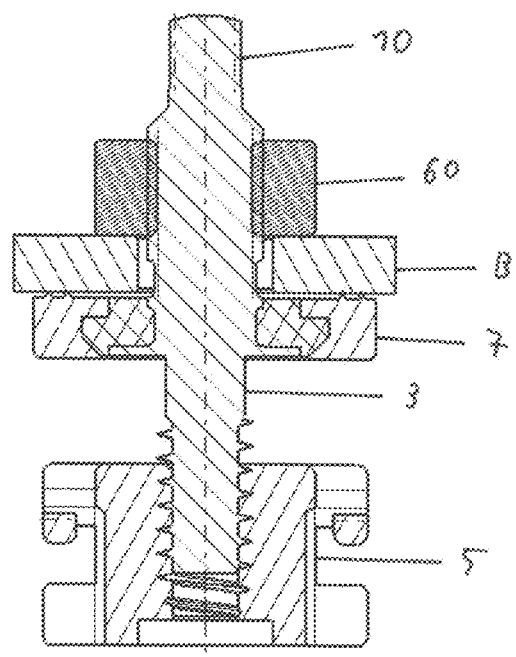

According to a first example, the thread bolt 3 is rotated counter-clockwise in case of an exemplary right-handed thread as the first external thread 12. After overcoming the start-up torque L, the distance between the abutment portion 40 which is formed by the second plastic overmold 7 and the fastening structure 20 is increased in case of a rotation. For this purpose, the inhibiting torque H must be overcome. This takes place until the abutment portion 40 abuts the second component B, as is shown in FIG. 22. Subsequently, the second component B and the tolerance compensation element 1 are fixed in this position, by for example screwing a nut 60, which fits onto the second external thread 14, on the second external thread 14. This is shown in FIG. 23.

According to a second example, the rotation of the thread bolt 3 takes place clockwise so that the distance between the fastening structure 20 and the abutment portion 40 is further decreased. When the first plastic overmold 5 is configured open adjacent to the associated axial end of the thread bolt 3, the axial end of the thread bolt 3 may project from the first plastic overmold 5 in the end.

The above explanations apply analogously to an exemplary left-handed thread as the first external thread 12.

Thus, an advantage of the tolerance compensation element 1 is that in the initial state, it is present as a one-part tolerance compensation element 1. A two-part tolerance compensation element 1 is present only after overcoming the start-up torque L between the fastening structure 20 and the first external thread 12. Thus, both the steps for producing the tolerance compensation element 1 as well as for establishing a connection between two components with the tolerance compensation element 1 are reduced compared with the state of the art, which has a positive effect on the production costs, too. Therefore, the tolerance compensation element 1 is optimized compared to known tolerance compensation elements while guaranteeing same characteristics in the later component connection.

Figure 18:
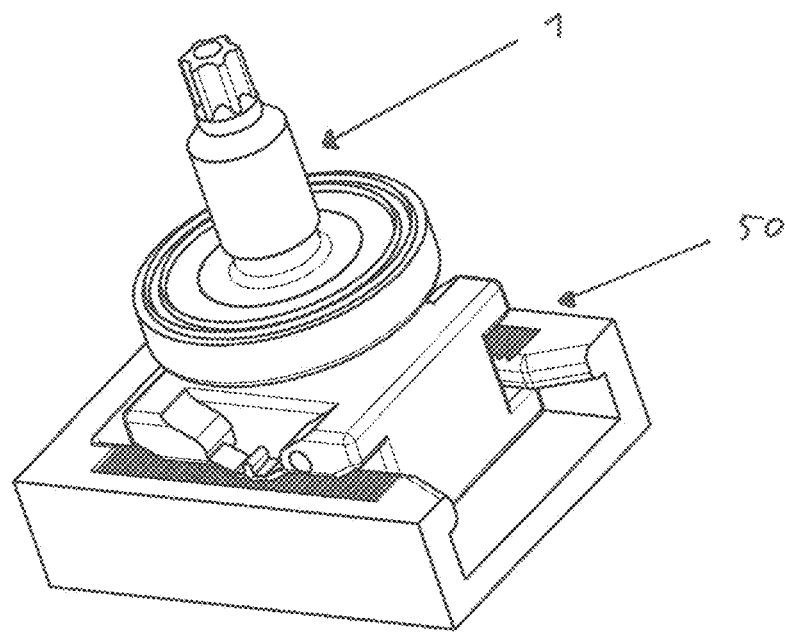

An embodiment of the connecting structure is shown in FIG. 18. It is comprised of the first component A with tolerance compensation element 1 fastened to it as well as a second component B. The tolerance compensation element 1 is fastened to the first component A with the first plastic overmold 5. In the present case, the fastening takes place via the base element 50 which is fastened to the first component A by means of gluing or the like.

In the connecting structure, the tolerance compensation element 1 abuts the second component B with the abutment portion formed by the second plastic overmold 7. A fastening of the second component B takes place by means of the nut 60 which is in engagement with the second external thread 14. To this end, reference is made to the illustration in FIG. 23.

Figure 24:
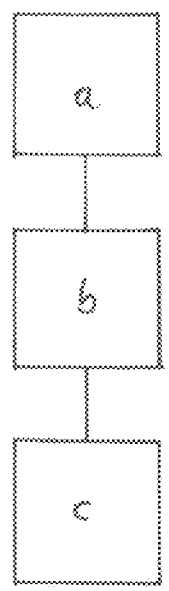

In FIG. 24, a schematic course of procedure of an embodiment of the production method for the tolerance compensation element 1 is shown.

As a first step a, the method includes the providing of a thread bolt 3 out of metal, having a first drive feature 10, a first external thread 12 of a first thread direction as well as a second external thread 14 of a second thread direction, wherein a protrusion 16 is provided between the first 10 and the second external thread 14 extending from the thread bolt 3 radially to the outside. The thread bolt 3 may be arranged in a mold of a plastic injection molding machine.

In step b, an overmolding of the portion of the first external thread 12 with a first plastic material now takes place. The resulting first plastic overmold 5 provides the fastening structure for the fastening to the first component A.

Before, after or at the same time of step b, the overmolding of the radially outwardly extending protrusion 16 of the thread bolt 3 with a second plastic material takes place in step c. The resulting second plastic overmold 7 provides the abutment portion which when using the tolerance compensation element 1 abuts the second component B and may be formed plate-like.

The first and the second plastic material can be the same or different. When using the same plastic material for the first 5 as well as the second plastic overmold 7, the steps b and c can be carried out at the same time. This facilitates the production. When two different plastic materials are supposed to be used, step b or step c is carried out first and after that the remaining step. It may be the use of two different plastic materials which enables a better adaptability to the respective application situation. An example for a plastic material for the first 5 and/or second plastic overmold 7 is PA6 GF 30.

Figure 25:
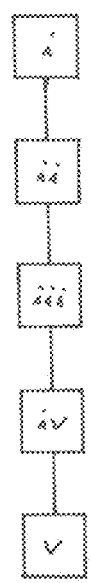

With respect to FIG. 25, a schematic course of procedure of an embodiment of the connecting method of a first component A with a second component B by means of the tolerance compensation element 1 is now explained. The method firstly comprises the step i of the fastening of the tolerance compensation element 1 to the first component A by means of the first plastic overmold 5. In the second step ii, the arranging of the second component B at a distance to the first component A then takes place. Subsequently, the start-up torque L between the first plastic overmold 5 and the first external thread 12 is overcome (step iii) and the thread bolt 1 is rotated until the abutment portion which is formed by the second plastic overmold 7 abuts the second component B (step iv). Finally, the screwing-on of a nut 60 onto the second external thread 14 takes place in step v, so that the second component B is fastened at a distance to the first component A.

The invention claimed is:

1. A tolerance compensation element with which tolerances in the distance between a first and a second component is compensable, wherein the tolerance compensation element comprises:
   a. a thread bolt out of metal having a first drive feature, a first external thread of a first thread direction as well as a second external thread of a second thread direction, wherein
   b. between the first and the second external thread, a protrusion is provided extending from the thread bolt radially to the outside,
   c. a first plastic overmold in the portion of the first external thread, which provides a fastening structure for the fastening to the first component, and
   d. a second plastic overmold around the protrusion which extends radially to the outside to provide an abutment portion abutting the second component when being in use, wherein
   e. a distance of the second plastic overmold to the first plastic overmold is changeable after overcoming a start-up torque between the first plastic overmold and the first external thread in longitudinal direction of the thread bolt.

2. The tolerance compensation element according to claim 1, wherein the first plastic overmold has the form of a fulcrum slide or of a bayonet lock or of an adhesive pad.

3. The tolerance compensation element according to claim 2, wherein the first external thread is configured in a thread-grooving manner and asymmetrically.

4. The tolerance compensation element according to claim 2, wherein the first drive feature is arranged on the axial end which is adjacent to the second external thread.

5. The tolerance compensation element according to one claim 1, wherein the first external thread is configured in a thread-grooving manner and asymmetrically.

6. The tolerance compensation element according to claim 5, wherein a side facing the second plastic overmold of the thread flank of the first external thread encloses with a reference line extending perpendicularly to the longitudinal axis of the tolerance compensation element and through the tip of the thread flank, an angle α which lies in the range from 7° to 12°, and a side, facing away from the second plastic overmold, of the thread flank encloses with the reference line an angle β which lies in the range from 15° to 25° or the side, facing away from the second plastic overmold, of the thread flank has a radius r which lies in the range of the 0.2-fold to 0.25-fold of the thread nominal diameter.

7. The tolerance compensation element according to claim 1, wherein the first drive feature is arranged on the axial end which is adjacent to the second external thread.

8. The tolerance compensation element according to claim 1, which furthermore includes a second drive feature that is arranged adjacent to the first external thread.

9. The tolerance compensation element according to claim 1, wherein adjacent to the first external thread, the axial end of the thread bolt is encompassed by the first plastic overmold.

10. The tolerance compensation element according to claim 1, wherein the abutment portion formed by the second plastic overmold comprises a sealing element on a side facing the second component.

11. The tolerance compensation element according to claim 10, wherein the abutment portion formed by the second plastic overmold comprises a crimping rip or several crimping rips as the sealing element.

12. The tolerance compensation element according to claim 1, wherein the first and the second plastic overmold are formed from the same plastic material or different plastic materials.

13. The tolerance compensation element according to claim 1, wherein the second plastic overmold has the shape of a plate.

14. The tolerance compensation element according to claim 1, wherein the start-up torque is a one-time increased start-up torque.

15. A first component to which a tolerance compensation element according to claim 1 is fastened.

16. The first component according to claim 15, wherein the fastening of the tolerance compensation element with the first plastic overmold takes place by means of a correspondingly configured base element to the first component or a correspondingly designed opening in the first component.

17. A connecting structure of a first component and a second component wherein the first component is a component according to claim 15, so that the tolerance compensation element with the first plastic overmold is fastened to or in the first component and abuts the second component with the abutment portion, wherein a fastening of the second component takes place by means of a nut, which engages with the second external thread.

18. A production method for a tolerance compensation element according to claim 1, including the steps:
   a. providing a thread bolt of metal comprising a first drive feature, a first external thread of a first thread direction as well as a second external thread of a second thread direction, wherein a protrusion is provided between the first and the second external thread extending from the thread bolt radially to the outside,
   b. overmolding the portion of the first external thread with a first plastic material, wherein the first plastic overmold provides a fastening structure for the fastening to the first component, and
   c. overmolding of the protrusion which extends radially to the outside with a second plastic material, wherein the second plastic overmold provides an abutment portion which in use abuts the second component.

19. The production method according to claim 18, wherein the first and the second plastic material are the same or different.

20. A connecting method of a first component with a second component by means of a tolerance compensation element according to claim 1, including the steps:
   a. fastening the tolerance compensation element to the first component by means of the first plastic overmold,
   b. arranging the second component with a distance to the first component,
   c. overcoming a start-up torque between first plastic overmold and first external thread as well as rotating the thread bolt until the abutment portion which is formed by the second plastic overmold abuts the second component and after that,
   d. screwing-on a nut onto the second external thread so that the second component is fastened with a distance to the first component.

* * * * *